(No Model.)
J. M. FOSTER.
Coupling for Pipes.
No. 238,376.   Patented March 1, 1881.
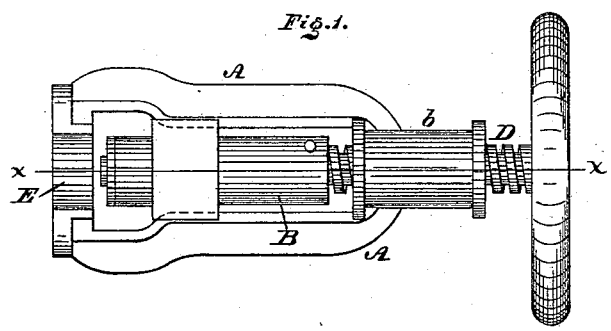
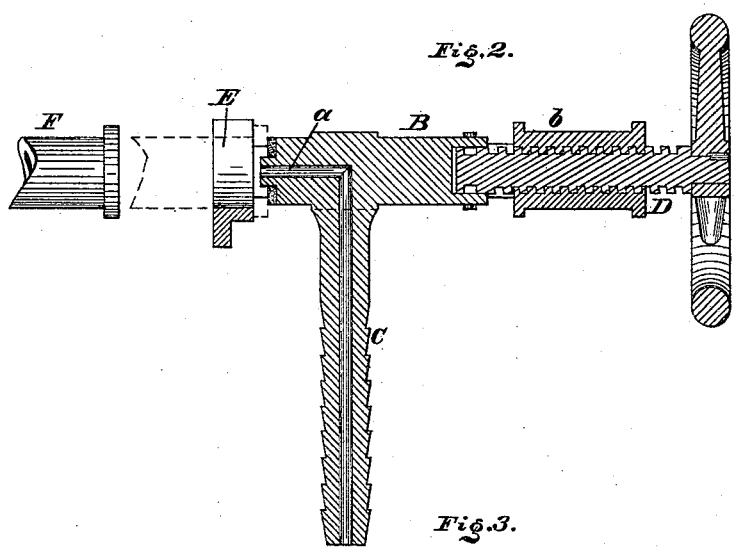
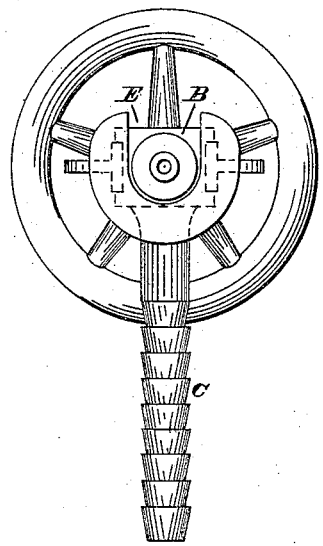
Witnesses:
A. P. Grant
H. F. Kircher
Inventor:
John M. Foster,
by John A. Wiedersheim
ATTORNEY.

United States Patent Office.

JOHN M. FOSTER, OF PHILADELPHIA, PENNSYLVANIA.

COUPLING FOR PIPES.

SPECIFICATION forming part of Letters Patent No. 238,376, dated March 1, 1881.

Application filed October 23, 1880. (No model.)

*To all whom it may concern:*

Be it known that I, JOHN M. FOSTER, a citizen of the United States, residing in the city and county of Philadelphia, and State of Pennsylvania, have invented a new and useful Improvement in Couplings for Pipes, &c., which improvement is fully set forth in the following specification and accompanying drawings, in which—

Figure 1 is a top or plan view of the coupling embodying my invention. Fig. 2 is a longitudinal section thereof in line $xx$, Fig. 1, the pipe to be coupled being detached, and also shown attached in dotted lines. Fig. 3 is an end view thereof.

Similar letters of reference indicate corresponding parts in the several figures.

My invention consists of a coupling for pipes constructed of a slide having a bore, with which communicates a branch attached to and moving with the slide, and a yoke which supports and guides the slide and receives the end of the pipe to be coupled, whereby, when the slide is properly moved, it clamps the pipe to the yoke, firmly connects them, and brings its bore in communication with that of the pipe, the joint between the parts being secure and tight.

Referring to the drawings, A represents a yoke consisting of a frame, between the sides of which is fitted a slide, B, from one end of which depends a branch, C, the bore of which communicates with a bore, $a$, formed in said end of the slide.

D represents a screw, which is fitted to a boss, $b$, on the frame or yoke A, and swiveled to the end of the slide opposite to the bore $a$, whereby, when the screw is rotated, a suitable handle being provided therefor, the slide may readily be moved.

The end of the yoke A opposite to the boss has a recess, throat, or groove, E, which is open from center to periphery of said end, so that the pipe F to be coupled may be fitted in the recess, said pipe having a flange which is adapted to be placed in the recess behind the inner or rear wall of the recess, while the body of the pipe rests on the base of said recess.

The branch C has connected to it a flexible pipe, leading, say, from a tank, reservoir, pipe, or other place of supply, and the pipe F is connected to a tank, reservoir, or other receiver which is to be filled from the first-named tank, &c., or to a valve or other device. The coupling is presented to the pipe F, or vice versa, and said pipe placed in the recess of the yoke, the flange being behind the same, as shown by the dotted lines, Fig. 2. The slide is then screwed toward the pipe F and tightened against the flange of said pipe, the effect of which is to clamp the pipe to the yoke A, and thus securely connect said parts and produce a tight joint between the slide and pipe, a washer or packing being previously properly applied to the end of either slide or pipe. The bore $a$ now communicates with the pipe F, and thus communication is established between the branch C and pipe F, so that fluid, gas, &c., may pass from one to the other.

When the coupling is to be removed or the branch and pipe are to be disconnected, the screw D is rotated in order to move the slide from the pipe, after which the coupling may be cleared of the pipe, the latter emerging from the recess E, and thus being released from the yoke.

It will be noticed that the branch C is a fixture of the slide B, and moves with it as it advances to and recedes from the pipe F.

Having thus described my invention, what I claim as new, and desire to secure by Letters Patent, is—

1. The yoke having an open throat and a flange-receiving recess behind the same, in combination with a clamping-slide having a bore adapted to communicate with the places of supply and service, substantially as and for the purpose set forth.

2. The yoke, in combination with a clamping-slide carrying a branch, substantially as and for the purpose set forth.

3. The yoke A, with recess E, the slide B, with bore $a$ and branch C, and the screw D, combined and operating as described, and forming an improvement in couplings.

J. M. FOSTER.

Witnesses:
JOHN A. WIEDERSHEIM,
F. COOPER.